United States Patent
Agarwal et al.

(10) Patent No.: US 9,454,444 B1
(45) Date of Patent: Sep. 27, 2016

(54) USING LOCATION TRACKING OF CLUSTER NODES TO AVOID SINGLE POINTS OF FAILURE

(75) Inventors: Sandeep Agarwal, Fremont, CA (US); Chio Fai Aglaia Kong, San Jose, CA (US); Karthik Ramamurthy, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 1558 days.

(21) Appl. No.: 12/407,237

(22) Filed: Mar. 19, 2009

(51) Int. Cl.
*G06F 11/20* (2006.01)
*G06F 11/14* (2006.01)

(52) U.S. Cl.
CPC ....... *G06F 11/2023* (2013.01); *G06F 11/1425* (2013.01)

(58) Field of Classification Search
None
See application file for complete search history.

(56) References Cited

U.S. PATENT DOCUMENTS

| | | | |
|---|---|---|---|
| 5,247,464 A * | 9/1993 | Curtis | 379/25 |
| 5,852,724 A | 12/1998 | Glenn et al. | |
| 5,946,685 A | 8/1999 | Cramer et al. | |
| 6,230,246 B1 | 5/2001 | Lee et al. | |
| 6,353,898 B1 | 3/2002 | Wipfel et al. | |
| 6,360,331 B2 | 3/2002 | Vert et al. | |
| 6,389,433 B1 | 5/2002 | Bolosky et al. | |
| 6,421,777 B1 | 7/2002 | Pierre-Louis et al. | |
| 6,427,163 B1 * | 7/2002 | Arendt et al. | 709/201 |
| 6,438,642 B1 | 8/2002 | Shaath | |
| 6,438,705 B1 | 8/2002 | Chao et al. | |
| 6,493,811 B1 | 12/2002 | Blades et al. | |
| 6,513,051 B1 | 1/2003 | Bolosky et al. | |
| 6,526,521 B1 | 2/2003 | Lim | |
| 6,587,959 B1 | 7/2003 | Sjolander et al. | |
| 6,624,750 B1 | 9/2003 | Marman et al. | |
| 6,629,266 B1 | 9/2003 | Harper et al. | |
| 6,738,345 B1 | 5/2004 | Williamson | |
| 6,754,664 B1 | 6/2004 | Bush | |
| 6,754,781 B2 | 6/2004 | Chauvel et al. | |
| 6,763,479 B1 | 7/2004 | Hebert | |
| 6,799,316 B1 | 9/2004 | Aguilar et al. | |
| 6,920,537 B2 | 7/2005 | Ofek et al. | |

(Continued)

OTHER PUBLICATIONS

Veritas (Veritas Cluster Server User's Guide—Solaris—5.0); Symantec Corporation; 2006; 700 pages.*
Quéma, et al., "An asynchronous middleware for Grid resource monitoring" (abstract), Sep. 2003, 2 pages, downloaded from http://www3.interscience.wiley.com/journal/107638010/abstract?CRETRY=1&SRETRY=0.

(Continued)

*Primary Examiner* — Keith Vicary
(74) *Attorney, Agent, or Firm* — Rory D. Rankin; Meyertons, Hood, Kivlin, Kowert & Goetzel, P.C.

(57) ABSTRACT

Systems and methods are provided to track cluster nodes and provide high availability in a computing system. A computer system includes hosts, a cluster manager, and a cluster database. The cluster database includes entries corresponding to the hosts which identify the physical location of a corresponding host. The cluster manager uses the data to select at least two hosts and assign the selected hosts to a service group for executing an application. The cluster manager selects hosts via an algorithm that determines which hosts are least likely to share a single point of failure. The data includes a hierarchical group of location attributes describing two or more of a host's country, state, city, building, room, enclosure, and radio frequency identifier (RFID). The location-based algorithm identifies a group of selected hosts whose smallest shared location attribute is highest in the hierarchical group. The system updates the data whenever a physical location of a host changes.

20 Claims, 8 Drawing Sheets

(56) References Cited

U.S. PATENT DOCUMENTS

| | | | |
|---|---|---|---|
| 6,922,791 | B2 | 7/2005 | Mashayekhi et al. |
| 6,943,828 | B1 | 9/2005 | Grimes et al. |
| 6,944,788 | B2 | 9/2005 | Dinker et al. |
| 6,983,365 | B1 | 1/2006 | Douceur et al. |
| 7,137,040 | B2 | 11/2006 | Bae et al. |
| 7,200,604 | B2 | 4/2007 | Forman et al. |
| 7,302,593 | B2 | 11/2007 | Rothman et al. |
| 7,310,644 | B2 | 12/2007 | Adya et al. |
| 7,359,920 | B1 | 4/2008 | Rybicki et al. |
| 7,376,722 | B1 | 5/2008 | Sim et al. |
| 7,424,514 | B2 | 9/2008 | Noble et al. |
| 7,478,113 | B1 | 1/2009 | De Spiegeleer et al. |
| 2002/0198996 | A1* | 12/2002 | Sreenivasan et al. ........ 709/226 |
| 2003/0041057 | A1 | 2/2003 | Hepner et al. |
| 2003/0079154 | A1 | 4/2003 | Park et al. |
| 2003/0097422 | A1 | 5/2003 | Richards et al. |
| 2003/0126242 | A1 | 7/2003 | Chang |
| 2003/0159083 | A1* | 8/2003 | Fukuhara et al. ............. 714/11 |
| 2003/0163780 | A1 | 8/2003 | Kossa |
| 2004/0083358 | A1 | 4/2004 | Zhou et al. |
| 2004/0089482 | A1 | 5/2004 | Ramsden et al. |
| 2004/0158777 | A1 | 8/2004 | Bae et al. |
| 2004/0243572 | A1* | 12/2004 | Muto ................................ 707/3 |
| 2004/0268340 | A1 | 12/2004 | Steeb et al. |
| 2005/0015780 | A1 | 1/2005 | McKeon et al. |
| 2005/0055418 | A1 | 3/2005 | Blanc et al. |
| 2005/0091375 | A1 | 4/2005 | Straub et al. |
| 2005/0172161 | A1 | 8/2005 | Cruz et al. |
| 2005/0188265 | A1 | 8/2005 | Pomaranski et al. |
| 2005/0198328 | A1 | 9/2005 | Lee et al. |
| 2005/0204183 | A1 | 9/2005 | Saika |
| 2005/0216813 | A1 | 9/2005 | Cutts et al. |
| 2005/0223278 | A1 | 10/2005 | Saika |
| 2005/0283636 | A1 | 12/2005 | Vasudevan et al. |
| 2005/0289390 | A1 | 12/2005 | Baba |
| 2006/0015773 | A1 | 1/2006 | Singh et al. |
| 2006/0047776 | A1* | 3/2006 | Chieng et al. ................. 709/217 |
| 2006/0053337 | A1 | 3/2006 | Pomaranski et al. |
| 2006/0075294 | A1* | 4/2006 | Ma et al. ......................... 714/13 |
| 2006/0080568 | A1* | 4/2006 | Subbaraman et al. ............ 714/4 |
| 2006/0085418 | A1 | 4/2006 | Piper et al. |
| 2006/0161637 | A1 | 7/2006 | Friess et al. |
| 2006/0168192 | A1 | 7/2006 | Sharma et al. |
| 2007/0206611 | A1 | 9/2007 | Shokri et al. |
| 2007/0255819 | A1 | 11/2007 | Hua et al. |
| 2009/0070623 | A1* | 3/2009 | Sciacca ............................. 714/4 |

OTHER PUBLICATIONS

"Using the Event Monitoring Service", Hewlett-Packard Corp., Nov. 1999, 102 pages.

Baker, et al, "javaGMA: A lightweight implementation of the Grid Monitoring Architecture," UKUUG LISA/Winter Conference, High-Availability and Reliability, Bournemouth, Feb. 25-26, 2004, http://www.ukuug.org/events/winter2004/speakers+abstracts.shtml#id2717511.

Cottrell, "Network Monitoring Tools," Stanford Linear Accelerator Center, Stanford University, Palo Alto, CA, Nov. 24, 2007, 29 pages. (Printed from http://www.slac.stanford.edu/xorg/nmtf/nmtf-tools.html).

Veritas Cluster Server 4.0 User's Guide, Veritas Corp., Jan. 2004, 715 pages.

VERITAS Software Corporation, "Comprehensive Application Performance Management with Veritas i3™," 2003, 3 pages.

VERITAS Software Corporation, "VERITAS Enterprise Server Automation," 2003, 8 pages.

VERITAS Software Corporation, "Server Consolidation with VERITAS OpForce; Optimizing your Infrastructure Availability and Utlizations," 2003, 6 pages.

VERITAS Software Corporation, "Server Automation with VERITAS OpForce; Enterprise Operations Automation-Enhancing Workflows, Administration, and Management," 2003, 6 pages.

VERITAS Software Corporation, "Rapid Server Deployment with VERITAS OpForce; The Enterprise-Scale, Server Deployment Solution for Heterogeneous Environments," 2003, 6 pages.

VERITAS Software Corporation, "High Availability Clustering in a Microsoft Windows Environment; VERITAS Cluster Server for Microsoft Windows NT" 2000, 20 pages.

VERITAS Software Corporation, "VERITAS Cluster Server v2.0; Technical Overview," 2001, 12 pages.

VERITAS Software Corporation, "Managing Application Availability with Application Clustering and the VERITAS Cluster Server Version 2.0," 2002, 32 pages.

"SAP High Availability (BC-CCM-HAV)", Release 4.6C, Copyright Apr. 2001, pp. 1-258.

Monson, et al. "IBM WebSphere Application Server V6.1 on the Solaris 10 Operating System", IBM Redbooks, Mar. 2008, 492 pages, 1st Edition Version 61, International Business Machines Corporation.

* cited by examiner

USING LOCATION TRACKING OF CLUSTER NODES TO AVOID SINGLE POINTS OF FAILURE

BACKGROUND OF THE INVENTION

1. Field of the Invention

This invention relates to computer systems and, more particularly, to high availability and scalability of applications operating within clustered computer systems.

2. Description of the Related Art

Enterprises have become increasingly dependent on information technology applications for the success of their businesses. It has become critical for these applications to be available to employees, partners, and/or customers around the clock. In addition, it is desirable for these applications to scale to large numbers of users. Consequently, various strategies have been employed to increase the availability and scalability of applications. One strategy has been to deploy applications on multiple host computers. For example, each computer that hosts an application may be configured with one or more redundant failover computers to take its place in the event of a failure. Another strategy is to deploy applications that are distributed on a group of hosts, commonly referred to as a computer cluster. Computer clusters use multiple computers interconnected by a network to provide the services of a single larger computer. The individual hosts in a computer cluster may share the application's load and serve as failover hosts in the event any of the hosts fails or becomes overloaded.

In order to increase the effectiveness of the above strategies, it is desirable for failover hosts and cluster members to be configured such that there are as few single points of failure as possible among the members. For example, if two hosts share a power supply, a network connection, or some other critical resource, they are not good candidates to be primary and secondary hosts in a failover pairing. More generally, it may be desirable to configure applications among hosts that are separated geographically as much as possible. Geographic separation may include placing hosts in different enclosures, rooms in a building, different buildings, different cities, etc. to avoid single points of failure.

Unfortunately, in many distributed applications, hosts may be identified by a network address such as an IP address that conveys little, if any, geographic information. In addition, applications may be deployed in a virtualized environment in which hosts are arranged in computer clusters. Re-assignments lead to dynamic changes in the physical locations of hosts as the virtualization system performs load balancing and other tasks. Determination of the physical location of a host may be complicated by the above factors.

In view of the above, an effective system and method for assigning hosts to applications that results in high availability and scalability of the applications that accounts for these issues are desired.

SUMMARY OF THE INVENTION

Various embodiments of a computer system and methods are disclosed. In one embodiment, a computer system includes a plurality of hosts, a cluster manager, and a cluster database. The cluster database includes entries corresponding to the hosts, each entry including data identifying a physical location of a corresponding host. The cluster manager uses the data identifying a physical location of a corresponding host to select at least two hosts and assign the selected hosts to a service group for executing an application.

In a further embodiment, the cluster manager selects hosts via a location-based algorithm that determines which hosts are least likely to share a single point of failure. In a still further embodiment, the data identifying a physical location of a corresponding host includes a hierarchical group of location attributes describing two or more of a host's country, state, city, building, room, enclosure, and RFID. The location-based algorithm identifies a group of selected hosts whose smallest shared location attribute is highest in the hierarchical group.

In a still further embodiment, the system updates the data identifying a physical location of a corresponding host in the cluster database in response to detecting that a physical location of a host has changed. In a still further embodiment, at least some of the hosts are virtual hosts in a virtualized environment and a physical location of each virtual host may change dynamically during host operation. In a still further embodiment the at least two hosts include a primary host and a secondary host. The primary host is configured to execute at least a portion of an application and the secondary host is configured to execute the at least a portion of the application in response to an indication that the primary host has failed. In a still further embodiment, the service group includes two or more load-balancing hosts that share tasks associated with an application.

These and other embodiments will become apparent upon consideration of the following description and accompanying drawings.

Figure 1:
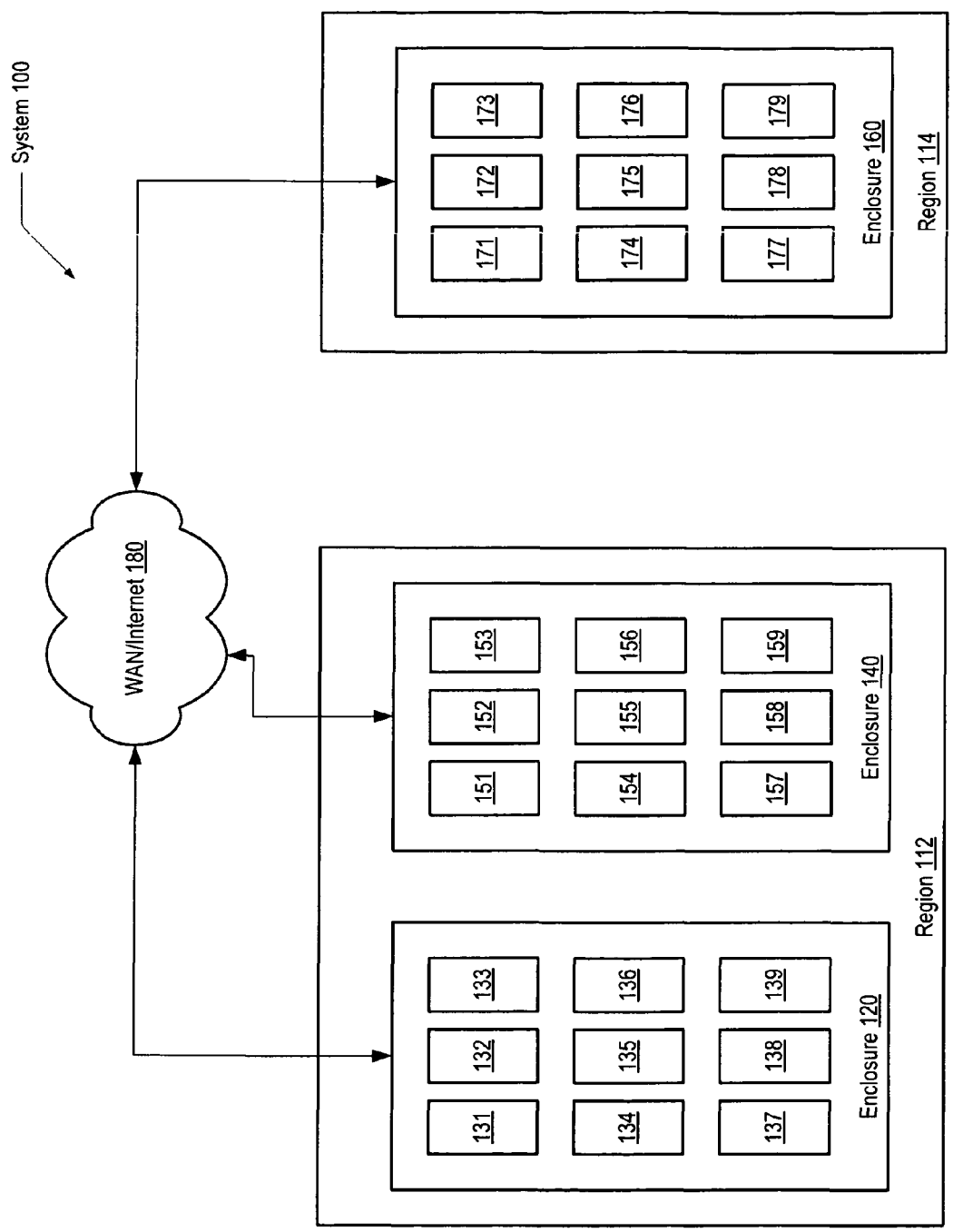
FIG. 1 is a generalized block diagram of one embodiment of a multi-host computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of one embodiment of a multi-host computer system 100. In the illustrated embodiment, system 100 includes two regions 112 and 114. Region 112 includes two enclosures 120 and 140. Region 114 includes an enclosure 160. Enclosure 120 includes hosts 131-139, enclosure 140 includes hosts 151-159, and enclosure 160 includes hosts 171-179. Enclosures 120, 140, and 160 and their included hosts may be interconnected via a WAN/Internet connection 180. Regions, as used herein, may refer to any of a variety of geographical divisions such as country, state, city, building, lab, etc. Enclosure, as used herein, may refer to a rack, a portion of a rack such as a shelf, or a group of racks that share a resource such as a power supply or network connection and the like.

In alternative embodiments, system 100 may include a different number of regions, enclosures, and/or hosts as needed to support a variety of high availability and highly scalable applications. Hosts may be grouped in a variety of ways to form computing clusters depending on the needs of the applications that are supported. The hosts that are included in a cluster may be physically located in the same enclosure or in different enclosures in the same region, or in different regions.

During operation, virtualization may be implemented on any of hosts 131-139, 151-159, and 171-179. Accordingly, each of hosts 131-139, 151-159, and 171-179 may include one or more virtual hosts. Distributed applications may be executed computer clusters consisting of the virtual hosts the are included in physical hosts 131-139, 151-159, and 171-179.

Figure 2:
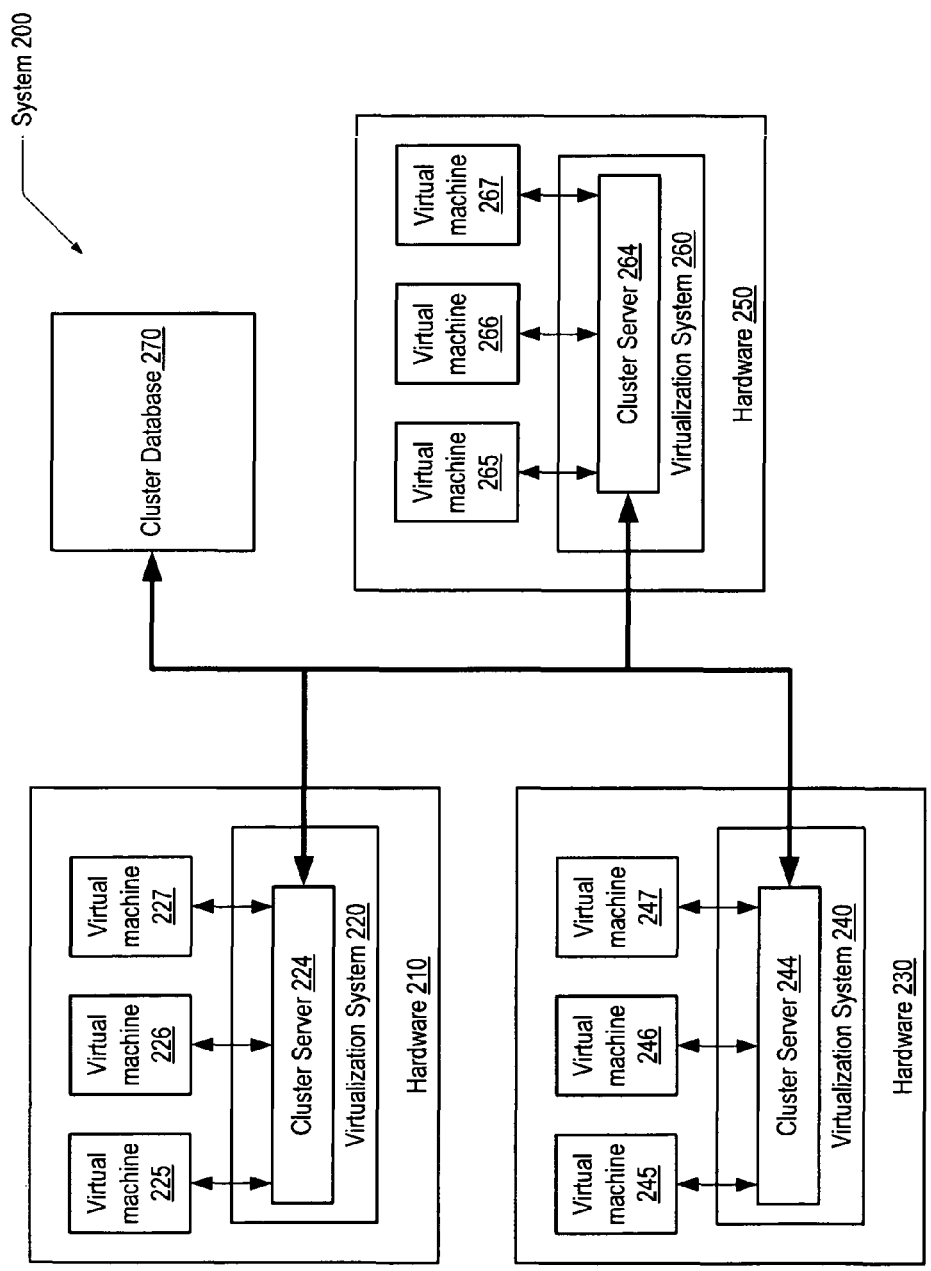
FIG. 2 is a generalized block diagram of one embodiment of a virtualized computer system that may operate on the computer system illustrated in FIG. 1.

FIG. 2 is a generalized block diagram of one embodiment of a virtualized computer system 200 that may operate on computer system 100. System 200 includes hardware 210, 230, and 250. Each of hardware 210, 230, and 250 represents one or more physical hosts such as hosts 131-139, 151-159, and 171-179 of FIG. 1. System 200 also includes a cluster database 270 that may operate on one or more of hosts 131-139, 151-159, and 171-179 of FIG. 1. Hardware 210 includes a virtualization system 220 and virtual machines 225-227. Virtualization system 220 includes a cluster server 224 that is coupled to and manages virtual machines 225-227. Similarly, hardware 230 includes a virtualization system 240 and virtual machines 245-247. Virtualization system 240 includes a cluster server 244 that is coupled to and manages virtual machines 245-247. Hardware 250 includes a virtualization system 260 and virtual machines 265-267. Virtualization system 260 includes a cluster server 264 that is coupled to and manages virtual machines 265-267. Cluster servers 224, 244, and 264 may be coupled to each other and to cluster database 270 by a network such as a LAN, WAN, or the Internet.

Virtualization systems 220, 240, and 260 may be any of a variety of systems that manage the resources provided by host hardware and provide virtual machines on which one or more applications may be executed. Applications that may be executed on the provided virtual machines include database applications, email systems, collaboration systems and the like. Cluster servers 224, 244, and 264 may be instances of any of a variety of software products for managing virtualized computer clusters such as VCSOne from Symantec Corporation, etc. During operation, virtualization systems 220, 240, and 260 provide resources that cluster servers 224, 244, and 264 provision as clusters of nodes, where each node provides computing functionality for one or more applications. Nodes may be organized as service groups providing redundancy to increase availability and scalability of the applications. Service groups may include as few as two nodes operating as a primary computing element and a failover computing element Service groups may also include much larger arrays of redundant nodes on which an application may be distributed. Cluster servers 224, 244, and 264 may maintain records of the nodes that are in use and/or available within cluster database 270.

Figure 3:
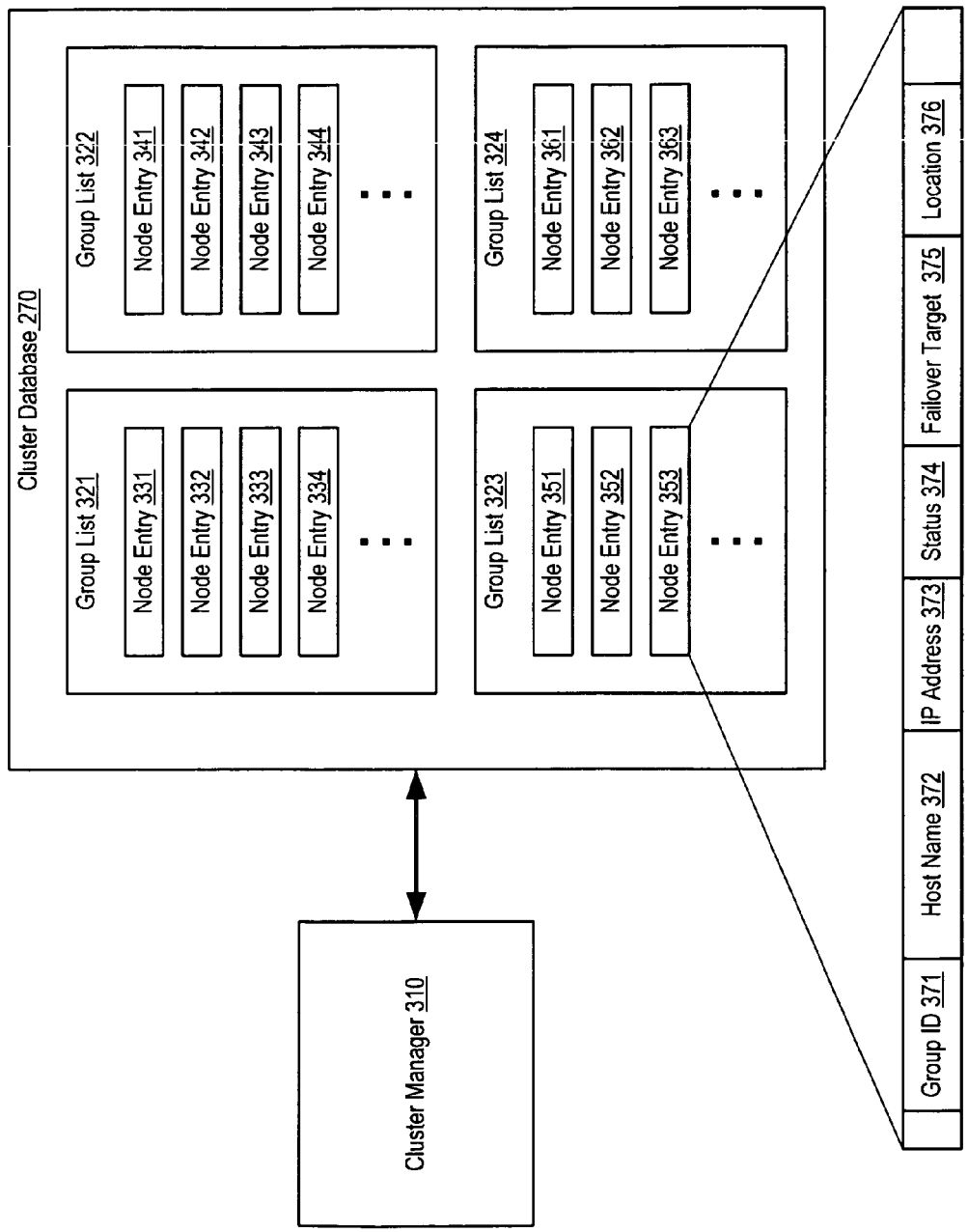
FIG. 3 illustrates one embodiment of a cluster manager coupled to a cluster database.

FIG. 3 illustrates one embodiment of a cluster manager 310 coupled to a cluster database 270. In one embodiment, cluster manager 310 may be functionality implemented through one or more of cluster servers 224, 244, and 264 of FIG. 2. In alternative embodiments cluster manager 310 may be part of cluster database 270 or may reside on any other host connected to system 200. Cluster database 270 includes one or more group lists as represented in the illustrated embodiment by group lists 321-324. Each group lists includes one or more node entries, where each node entry corresponds to a cluster node. For example, group list 321 includes node entries 331-334, etc., group list 322 includes node entries 341-344, etc., group list 323 includes node entries 351-353, etc., and group list 324 includes node entries 361-363, etc. In one embodiment, a given node may be a member of multiple groups and correspond to multiple node entries.

Each node entry includes a set of attributes, as shown at the bottom of FIG. 3 for node entry 353. In the illustrated embodiment, node entry 353 includes the following attribute fields: group ID 371, a host name 372, an IP address 373, status 374, a failover target 375 and a location 376. Other embodiments may include fewer, more, or different attributes.

In one embodiment, group ID field 371 may include an identifier for the group of which the corresponding node is a member. Host name field 372 may include a name for the corresponding host that is recognizable to a user or system administrator. IP address 373 may include an IP address to be used to communicate with the corresponding node. Status field 374 may include data indicating whether or not a corresponding node is operating, has connectivity, is backed up by a failover target, is a failover target for another node, etc. Items that are included in status field 374 may be determined according to the needs of individual clusters and/or by cluster manager 310. Failover target field may include data identifying a failover target for the corresponding node, such as an IP address, hostname, or other identifiers. Location field 376 may include data that specifies a physical location of the corresponding node. An example of one embodiment of physical location data is presented below.

During operation, whenever a new service group is created, cluster manager 310 may create a corresponding group list in cluster database 270 and populate a node entry for each node that is a member of the service group. Cluster manager 310 may also update each group list whenever there are membership changes in the corresponding service group. For example, if a service group includes virtual machines in a virtualized environment, group lists may be updated by cluster manager 310 in response to changes in the location of any virtual machines that are members of the group. Also, cluster manager 310 may update group lists if a node fails. In one embodiment, the cluster manager may send a heartbeat signal to each node in each cluster to monitor cluster node status. If a particular node does not respond to the heartbeat signal, cluster manager 310 may update the status of the particular node in each group list of which the node is a member. In addition, cluster manager 310 may update group lists in response to a user input, a command, or on a periodic basis according to a schedule, etc. User inputs or commands may optionally include a request to reconfigure one or more groups. These and other update circumstances will be apparent to one of ordinary skill in the art.

At various times, such as when a new service group is created or updated, cluster manager 310 may select particular nodes for membership in particular service groups so as to maximize service availability and/or scalability or to minimize single points of failure in the service groups. For example, cluster manager 310 may select two nodes for membership in a redundant pair from a group of nodes such that the physical locations of the selected nodes have the greatest separation of all available pairs of nodes. In more complex service groups, cluster manager 310 may use other algorithms to minimize common physical locations among the nodes. Cluster manager 310 may apply a set of rules for selecting nodes. For example a rule may specify that two nodes that are located in the same enclosure may not be assigned to the same service group. Various other selection rules are possible and are contemplated.

Figure 4:
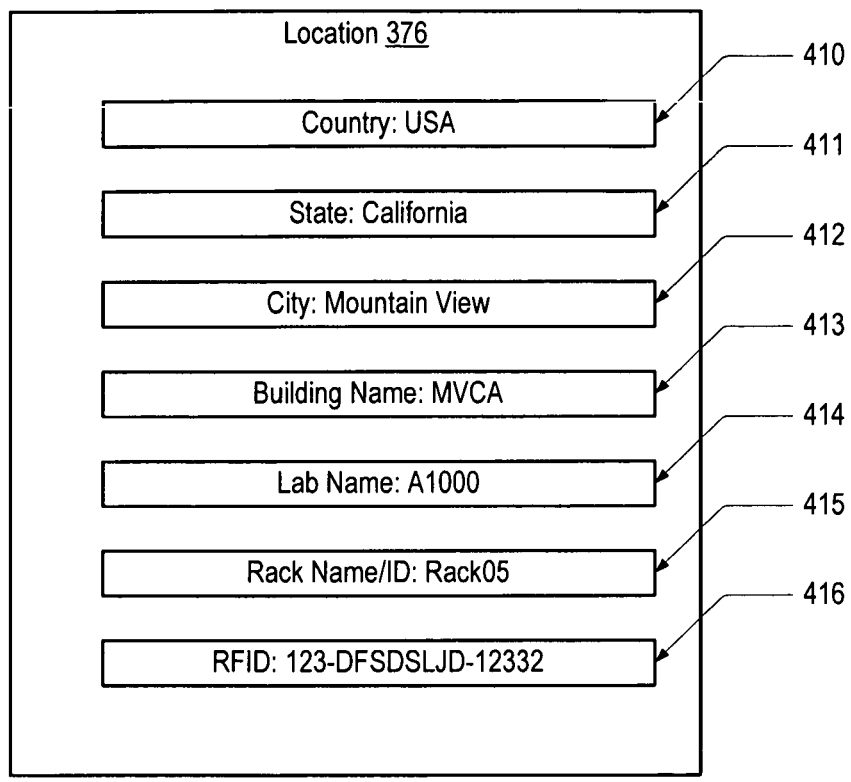
FIG. 4 illustrates one example of physical location data.

FIG. 4 illustrates one example of physical location data that may be found in one embodiment of location field 376. In the illustrated embodiment, location field 376 includes subfields 410-416. Other embodiments may include fewer, more, or different subfields. In one embodiment a set of subfields may be hierarchical, i.e. each successive subfield may be a smaller subdivision of a previous subfield. As shown, subfield 410 may contain data identifying the country in which the corresponding node is located. Subfield 411 may contain data identifying the state in which the corresponding node is located. Subfield 412 may contain data identifying the city in which the corresponding node is located. Subfield 413 may contain data identifying the building in which the corresponding node is located. Subfield 414 may contain data identifying the lab or room in a building in which the corresponding node is located. Subfield 415 may contain data identifying the enclosure, such as a rack or shelf in which the corresponding node is located. Subfield 416 may contain data identifying the corresponding node by a unique radio frequency identifier (RFID) or other unique tag for distinguishing one node from other nodes even within the same enclosure.

Figure 5:
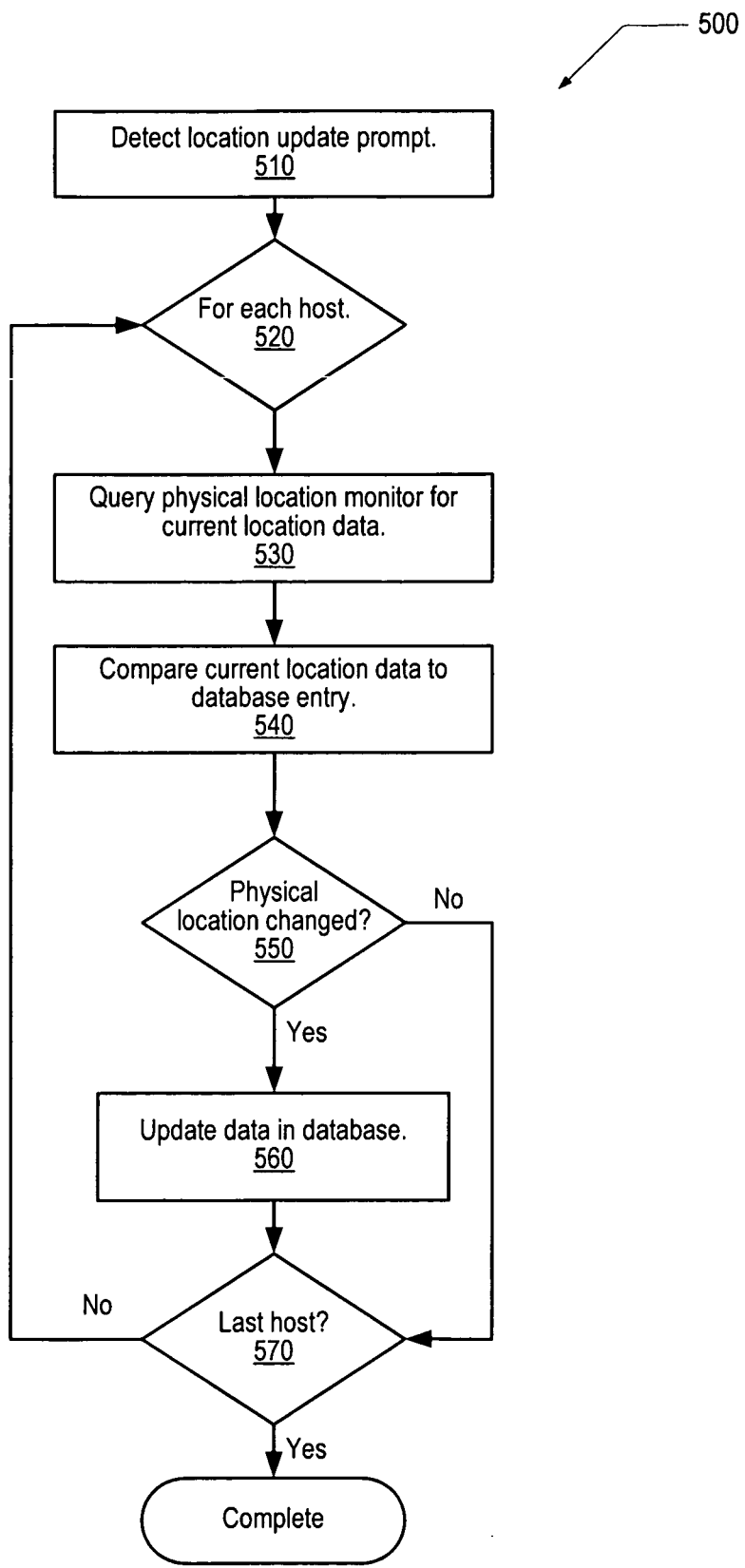
FIG. 5 illustrates one embodiment of a process that may be used to update physical location information for a group of hosts.

FIG. 5 illustrates one embodiment of a process 500 that may be used to update physical location information for a group of hosts. In one embodiment, a cluster manager may execute process 500. Process 500 may begin with detection of a location update prompt (block 510) to update location information for a group of hosts. As described above, an update may be requested by a user, at scheduled intervals, in response to a host failure, in response to a re-configuration request, or any of a variety of other reasons. For each host in the group (decision block 520), a query may be sent to a physical location monitor that returns physical location data for the host (block 530). The returned data may be compared to current location data for the host stored in a cluster database entry that corresponds to the host (block 540). If the comparison indicates that the host's physical location has changed (decision block 550), the cluster database entry may be updated (block 560). After the cluster database entry has been updated or if the comparison indicates that the host's physical location has not changed (decision block 550) and if the host is the last host (decision block 570), process 500 may be complete. Otherwise, process 500 may return to decision block 520 to evaluate the physical location of the next host.

Figure 6:
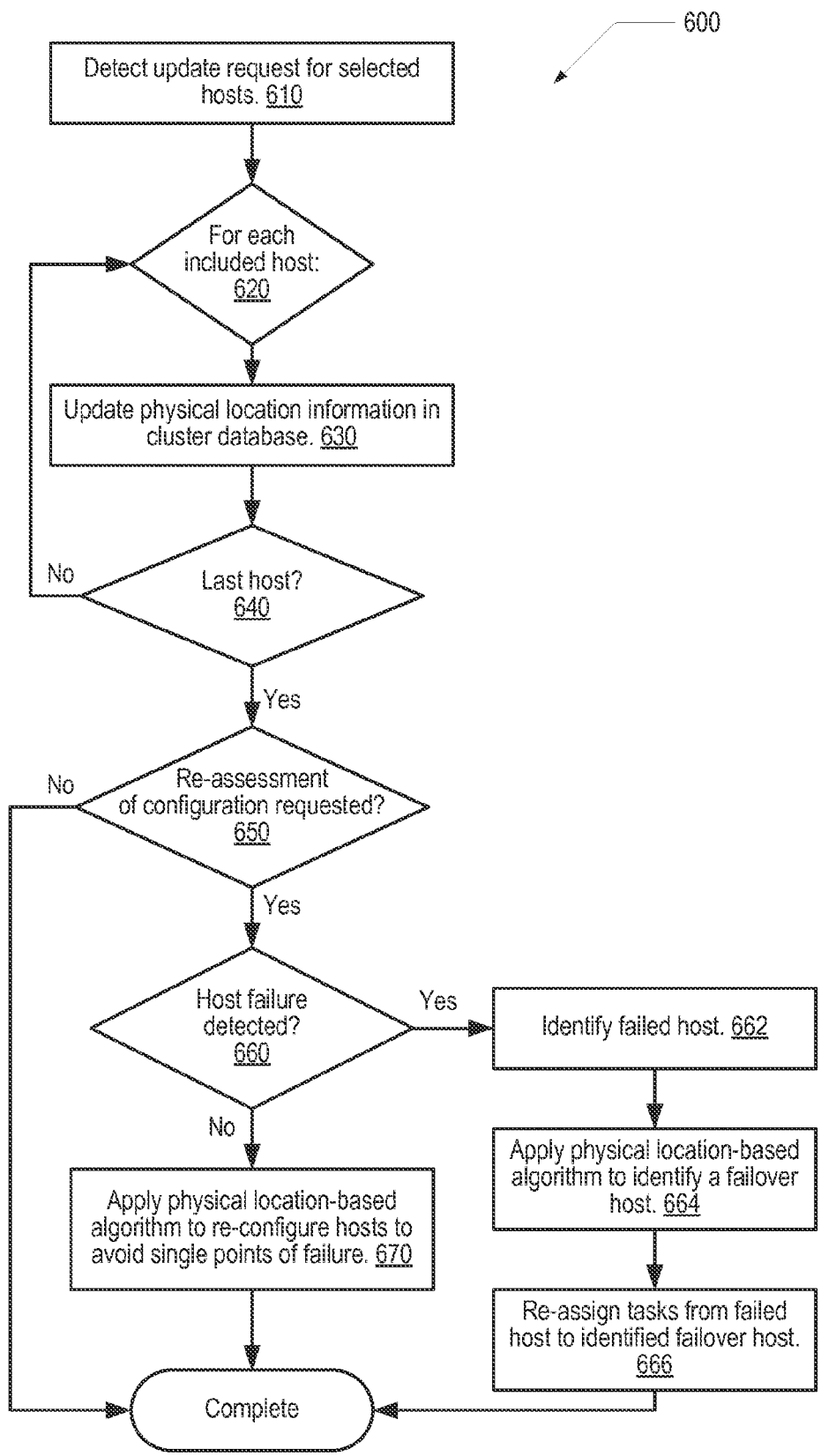
FIG. 6 illustrates one embodiment of a process that may be used assign hosts to groups based on physical location information.

FIG. 6 illustrates one embodiment of a process 600 that may be used to assign hosts to groups based on physical location information. In one embodiment, a cluster manager may execute process 600. Process 600 may begin with detection of a request to update information for selected hosts (block 610). For each of the selected hosts (decision block 620), a database entry in a cluster database may be updated (block 630) After all of the selected host's entries have been updated (decision block 640), if a re-assessment of the configuration of the hosts has not been included in the request (decision block 650), process 600 is complete. If a re-assessment of the configuration of the hosts has been included in the request (decision block 650) and a host failure has been detected (decision block 660), the failed host may be identified (block 662), a failover host may be identified based on an algorithm that takes the physical location of the failed host and the failover host candidates into account (block 664), and tasks that were assigned to the failed host may be reassigned to the failover host (block 666), completing process 600. If a re-assessment of the configuration of the hosts has been included in the request (decision block 650) and a host failure has not been detected (decision block 660), a physical location-based algorithm may be applied to re-configure the hosts to avoid single points of failure (block 670), completing process 600.

Figure 7:
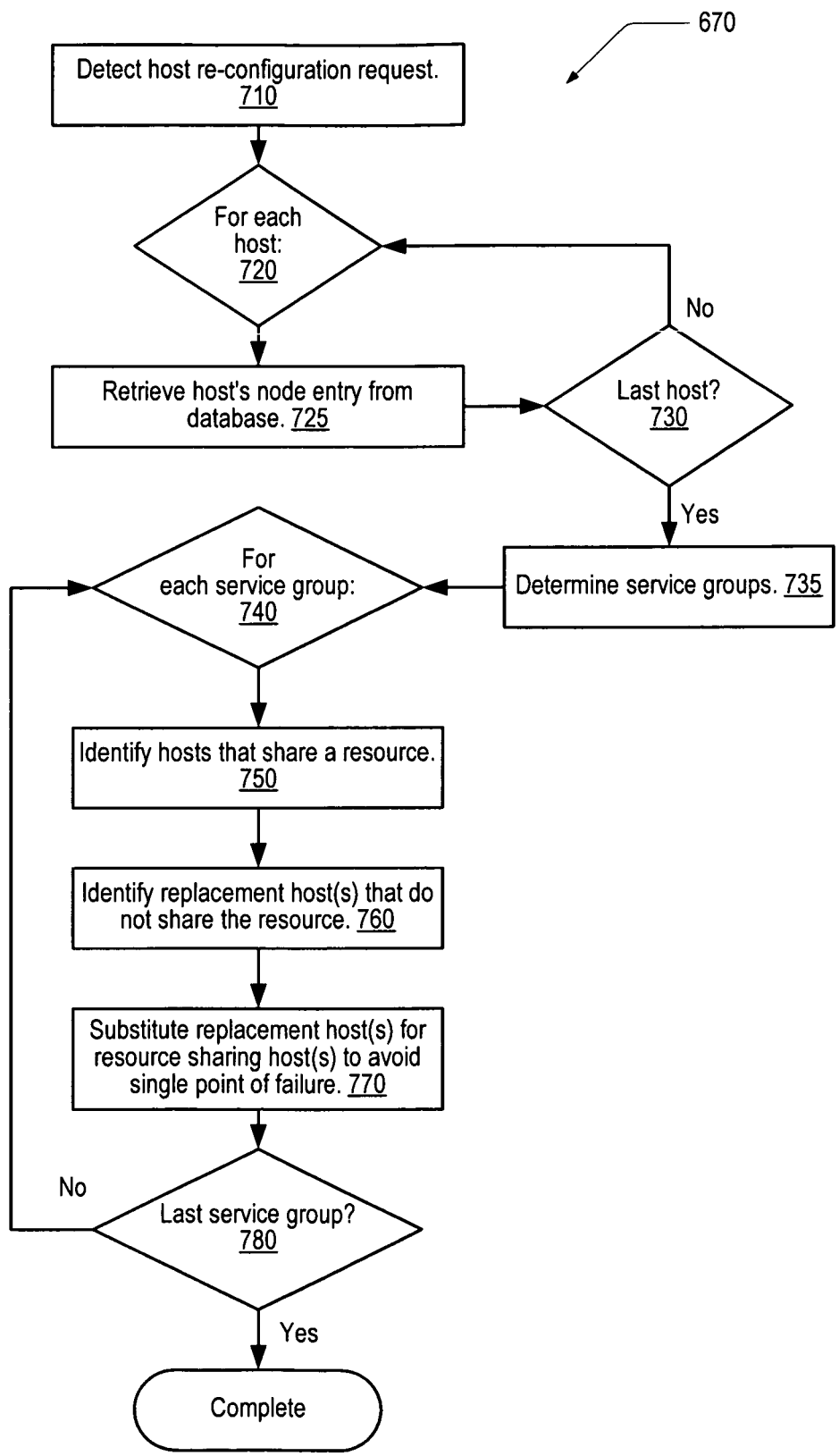
FIG. 7 illustrates a more detailed embodiment of a portion of the process illustrated in FIG. 6 that may be used to avoid single points of failure in computer clusters.

FIG. 7 illustrates a more detailed embodiment of a process that may be included in block 670 of process 600 that may be used to avoid single points of failure in computer clusters. The illustrated process may begin with detection of a request to re-configure a group of hosts (block 710). For each host in the group (decision block 720), a node entry may be retrieved from a database of node entries (block 725). After retrieval of all of the node entries for the group of hosts (decision block 730), a set of service groups may be determined (block 735). In one embodiment, the set of service groups includes all service groups that have at least one member from the group of hosts for which the re-configuration request is received. For each service group in the set (decision block 740), hosts in the same service group that share a resource may be identified (block 750). Replacement hosts may then be identified that do not share the resource and are candidates for membership in the same service group (block 760). Each identified replacement host may be substituted for one of the hosts that shares a resource (block 770). Blocks 750, 760, and 770 may be repeated until the number of hosts that share a resource is minimized. Additional service groups may be evaluated until all service groups have been reconfigured (decision block 780), completing the illustrated process.

Figure 8:
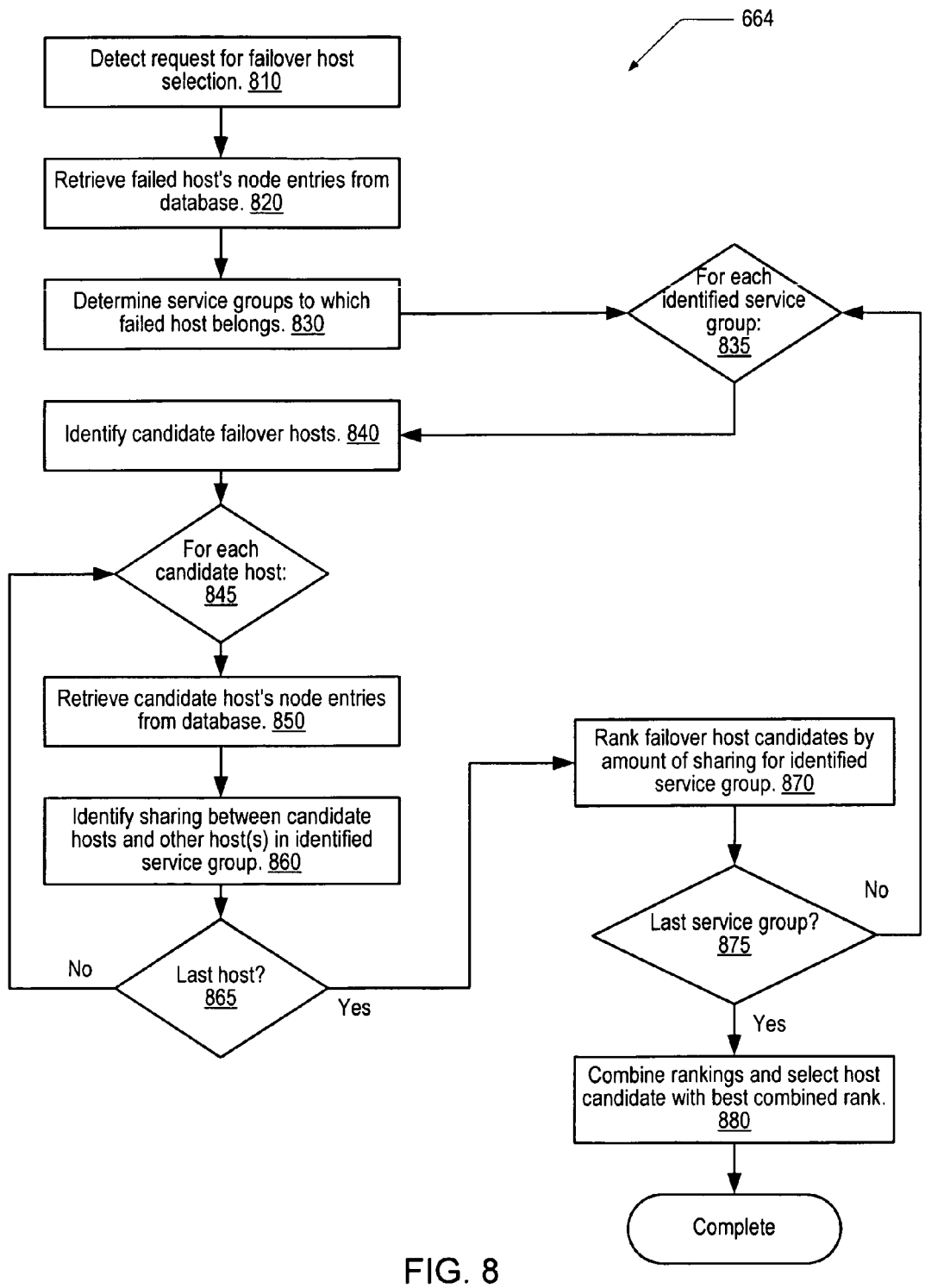
FIG. 8 illustrates a more detailed embodiment of a portion of the process illustrated in FIG. 6 that may be used to identify a failover host based on physical location information.

FIG. 8 illustrates a more detailed embodiment of a process that may be included in block 664 of process 600 that may be used to identify a failover host based on physical location information. The illustrated process may begin with detection of a request to select a failover host to replace a particular host that has failed (block 810). The failed host's node entries may be retrieved from a database of node entries (block 820). It is noted that a given node may belong to multiple service groups and therefore have multiple node entries in the database. From the retrieved node entries, a set of service groups of which the failed node is a member may be determined (block 830). For each service group in the set (decision block 835), one or more candidate hosts may be identified (block 840). For each candidate host (decision block 845), node entries may be retrieved from the database (block 850) and resource sharing between the candidate host and other hosts in the identified service group may be identified (block 860). After node entries have been retrieved for all candidate hosts (decision block 865), the candidate hosts may be ranked according to the amount of shared resources that have been identified (block 870). Once the candidates have been ranked for each identified service group (decision block 875), the resulting rankings may be combined and the host with the best combined rank selected as the failover host (block 880), completing the illustrated process. Rankings may be combined by averaging individual rankings, taking the host with the fewest shared resources, or any other suitable algorithm.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a plurality of hosts;
a cluster manager; and
a cluster database, wherein the cluster database comprises a plurality of entries corresponding to the plurality of hosts, each entry including a service group identifier (ID) identifying a service group of which a corresponding host is a member and physical location data identifying a physical location of the corresponding host;
wherein in response to receiving a reconfiguration request, the cluster manager is configured to:
retrieve from the cluster database an entry corresponding to a second host of the plurality of hosts having a same service group ID as a first host of the plurality of hosts; and
substitute a third host corresponding to a service group different from a service group of the first host for either the first host or the second host, in response to determining physical location data for the first host and the second host both identify a same enclosure, said enclosure comprising one of a group of racks, a rack, and a shelf on a rack.

2. The system as recited in claim 1, wherein prior to substituting the third host, the cluster manager is configured to:
retrieve for the third host a corresponding entry in the plurality of entries with a service group ID different from a service group ID of the first host, wherein the third host is a candidate for membership in a service group identified by the service group ID of the first host; and
determine the physical location data for the third host does not identify said enclosure.

3. The system as recited in claim 1, wherein said physical location data identifying a physical location of the corresponding host comprises a hierarchical group of two or more location attributes, wherein each successive attribute is a smaller subdivision of a previous attribute, and wherein the hierarchical group comprises two or more of a country, a state, a city, a building, a room, and one of a group of racks, a rack, and a shelf of a rack.

4. The system as recited in claim 3, wherein the cluster manager is further configured to identify a group of selected hosts whose smallest shared location attribute is highest in the hierarchical group.

5. The system as recited in claim 1,
wherein one or more of the plurality of hosts comprise virtual hosts in a virtualized environment;
wherein reassignment of a virtual host during host operation leads to a dynamic change in a physical location of a corresponding host of the plurality of hosts; and
wherein in response to detecting that a physical location of a host of the plurality of hosts changed, the cluster manager is further configured to update corresponding physical location data in the cluster database.

6. The system as recited in claim 1, wherein the first host is configured to execute at least a portion of an application and the second host is configured to execute the at least a portion of the application in response to an indication that the first host has failed.

7. The system as recited in claim 1, wherein in response to detecting a request for selecting a failover host for the first host, the cluster manager is further configured to:
retrieve for at least two candidate hosts of the plurality of hosts corresponding entries in the plurality of entries;
retrieve for each other host of the plurality of hosts in the same service group as the first host corresponding entries in the plurality of entries;
determine whether physical location data in the corresponding entries for the at least two candidate hosts and physical location data in the corresponding entries for said each other host identify a same enclosure; and
select the failover host for the first host from the at least two candidate hosts such that the selected failover host for the first host has a greater geographical separation with the first host than other hosts of the at least two candidate hosts as indicated by the retrieved physical location data.

8. A computer-implemented method comprising:
a computing process accessing a cluster database comprising a plurality of entries corresponding to a plurality of hosts, each entry including a service group identifier (ID) identifying a service group of which a corresponding host of the plurality of hosts is a member and physical location data identifying a physical location of the corresponding host;
in response to receiving a reconfiguration request:
retrieving from the cluster database an entry corresponding to a second host of the plurality of hosts having a same service group ID as a first host of the plurality of hosts; and
substituting a third host corresponding to a service group different from a service group of the first host for either the first host or the second host in response to determining physical location data for the first host and the second host both identify a same enclosure, said enclosure comprising one of a group of racks, a rack, and a shelf on a rack.

9. The method as recited in claim 8, wherein prior to substituting the third host, the method further comprises:
retrieving for the third host a corresponding entry in the plurality of entries with a service group ID different from a service group ID of the first host, wherein the third host is a candidate for membership in a service group identified by the service group ID of the first host; and determining the physical location data for the third host does not identify said enclosure.

10. The method as recited in claim 8, wherein said physical location data identifying a physical location of the corresponding host comprises a hierarchical group of two or more location attributes, wherein each successive attribute is a smaller subdivision of a previous attribute, and wherein the hierarchical group comprises two or more of a country, a state, a city, a building, a room, and one of a group of racks, a rack, and a shelf of a rack.

11. The method as recited in claim 10, wherein the method further comprises identifying a group of selected hosts whose smallest shared location attribute is highest in the hierarchical group.

12. The method as recited in claim 8,
wherein one or more of the plurality of hosts comprise virtual hosts in a virtualized environment;
wherein reassignment of a virtual host during host operation leads to a dynamic change in a physical location of a corresponding host of the plurality of hosts; and
wherein in response to detecting that a physical location of a host of the plurality of hosts changed, the method further comprises updating corresponding physical location data in the cluster database.

13. The method as recited in claim 8, the method further comprising:
the first host executing at least a portion of an application; and
the second host executing the at least a portion of the application in response to an indication that the first host has failed.

14. The method as recited in claim 8, wherein in response to detecting a request for selecting a failover host for the first host, the method further comprises:
retrieving for at least two candidate hosts of the plurality of hosts corresponding entries in the plurality of entries;
retrieving for each other host of the plurality of hosts in the same service group as the first host corresponding entries in the plurality of entries;
determining whether the physical location data in the corresponding entries for the at least two candidate hosts and physical location data in the corresponding entries for said each other host identify a same enclosure; and
selecting the failover host for the first host from the at least two candidate hosts such that the selected failover host for the first host has a greater geographical separation with the first host than other hosts of the at least two candidate hosts as indicated by the retrieved physical location data.

15. A non-transitory computer readable medium storing computer instructions that are executable by a processor to:
access a cluster database comprising a plurality of entries corresponding to a plurality of hosts, each entry including a service group identifier (ID) identifying a service group of which a corresponding host of the plurality of hosts is a member and physical location data identifying a physical location of the corresponding host;
in response to receiving a reconfiguration request:
retrieve from the cluster database an entry corresponding to a second host of the plurality of hosts having a same service group ID as a first host of the plurality of hosts; and
substitute a third host corresponding to a service group different from a service group of the first host for either the first host or the second host in response to determining physical location data for the first host and the second host both identify a same enclosure, said enclosure comprising one of a group of racks, a rack, and a shelf on a rack.

16. The computer readable medium as recited in claim 15, wherein prior to substituting the third host, the instructions are further executable to:
retrieve for the third host a corresponding entry in the plurality of entries with a service group ID different from a service group ID of the first host, wherein the third host is a candidate for membership in a service group identified by the service group ID of the first host; and
determine the physical location data for the third host does not identify said enclosure.

17. The computer readable medium as recited in claim 15, wherein said physical location data identifying a physical location of the corresponding host comprises a hierarchical group of two or more location attributes, wherein each successive attribute is a smaller subdivision of a previous attribute, and wherein the hierarchical group comprises two or more of a country, a state, a city, a building, a room, and one of a group of racks, a rack, and a shelf of a rack.

18. The computer readable medium as recited in claim 17, wherein the instructions are further executable to identify a group of selected hosts whose smallest shared location attribute is highest in the hierarchical group.

19. The computer readable medium as recited in claim 15,
wherein one or more of the plurality of hosts comprise virtual hosts in a virtualized environment;
wherein reassignment of a virtual host during host operation leads to a dynamic change in a physical location of a corresponding host of the plurality of hosts; and
wherein in response to detecting that a physical location of a host of the plurality of hosts changed, the instructions are further executable to update corresponding physical location data in the cluster database.

20. The computer readable medium as recited in claim 15, wherein the instructions are further executable to cause:
the first host to execute at least a portion of an application; and
the second host to execute the at least a portion of the application in response to an indication that the first host has failed.

* * * * *